Patented Oct. 22, 1946

2,409,844

UNITED STATES PATENT OFFICE 2,409,844

BASIC CAST REFRACTORY

Theodore Estes Field, Louisville, Ky., assignor to Corhart Refractories Company, Louisville, Ky., a corporation of Delaware No Drawing. Application January 29, 1942, Serial No. 428,795

7 Claims. (Cl. 106—57)

For use as a basic refractory, magnesia has been widely used for several years, and more recently its orthosilicate, forsterite, has also been favorably received. As made by the traditional burning process, such refractories are necessarily porous which permits infiltration of slags or vapors with consequent increased rate of corrosion in use. Furthermore magnesia refractories made by burning are notoriously weak in spalling resistance.

To eliminate this porosity and to produce a stronger bond it has been proposed to electrically melt and cast to shape, mixtures of magnesia and silica in such proportions as to yield a mixed periclase and forsterite refractory, the silica permitting the magnesia to be melted at a practical temperature and the excess magnesia yielding a more basic refractory.

When such melts are made, however, the porosity is found to persist, ranging from large blebs and blow holes at the highest magnesia percentages (highest melting points and greatest volatilization) to fairly well distributed porosity at the periclase-forsterite eutectic which porosity is nevertheless of such volume that it is capable of preventing and eliminating normal pipe formation which should occur when the liquid crystallizes to a more efficient packing of the molecules. It is further observed that castings high in magnesia are quite brittle while those high in forsterite exhibit a characteristic splitting in the plane of the major axis.

In the field of less basic refractories it has been proposed to further add alumina to the magnesia and silica in forming a melted and cast refractory. The alumina forms magnesia spinel which is compatible with periclase and forsterite, but for best results the spinel must exceed 50% and the silica must be restricted to 11% (26% forsterite as a maximum) which results in a considerably less basic refractory than desirable for many purposes.

I have discovered that certain compositions of melted and cast refractories can be made which are non-porous, non-brittle and uncracked if zirconia is included with the basic phases of periclase, forsterite and magnesia spinel. In the new system in contrast to the earlier system, 11% silica appears to be a minimum limit rather than a maximum limit. A gradation in basicity results according to which phases are used with the neutral $ZrO_2$.

My new refractories can be melted in an electric furnace and cast into preformed molds, for example, with the techniques given in U. S. Patent 1,615,750 to Fulcher. As raw materials I have employed zirkite, zircon, magnesite, talc, bauxite, kyanite and olivene although obviously any combination of available materials which will yield the desired chemical composition in the final melt will give equivalent results. There appears to be no significant advantage in using purer materials except that the iron oxide content must be kept reasonable to avoid porous castings. A certain amount of iron oxide is reduced and removed by the carbon of the electrodes and only with olivenes too high in FeO has porosity been troublesome. Even these castings, however, were free from cracks and suitable for some purposes. Any lime, titania, iron oxide or other minor impurities are found in the noncrystalline matrix since in practice, crystallization of my refractories is never complete.

Since the extent of crystallization depends upon the rate of cooling, the size of the casting, the extent of annealing, the chemical composition and other variable factors, in the following disclosure of my new refractories, I have elected to indicate the basicity of the compositions in terms of the amounts of major crystal phases, as calculated from the chemical composition, which would be present under equilibrium conditions, that is, after infinitely slow cooling. In this way an idea of the relative basicity is obtained even though this is obscured in practice by the fact that substantial amounts of glassy matrix may be present particularly if the silica is high.

In the binary system, $ZrO_2$ is known to take MgO into solid solution up to 25% by weight at the freezing point, but the solubility decreases rapidly with temperature. Since the solution of MGO converts the birefringent $ZrO_2$ crystal to an isometric (cubic) crystal of lower refractive index, petrographic examination will reveal whether solid solution is present. I have found some solid solution when $ZrO_2$ is added to forsterite but when spinel is further added, the solid solution is apparently suppressed. Finally when periclase is further added, solid solution returns. Since the equilibrium conditions for this solid solution are not accurately known, for the purpose of indicating the basicity of my compositions, I have ignored the solution and tabulated $ZrO_2$ alone.

In its broadest aspects the new system is quaternary but the quaternary system will be best understood after a discussion of the component binary and tertiary systems. The binary systems containing the new phase, zirconia, are zirconia-periclase, zirconia-magnesia spinel and zirconia-forsterite. In support of the necessity of including some 11% silica, I have found that the silica-free systems zirconia-periclase and zirconia-magnesia spinel yield castings which are porous and subject to cracking during cooling. From the practical standpoint these two binary systems are less desirable anyway because of the expense of silica-free ingredients. On the other hand excellent castings can be made in the forsterite-zirconia system provided over 11% silica is present, as little as 15% zirconia being sufficient to eliminate the characteristic splitting of forsterite compositions and give non-porous and non-brittle castings when properly annealed by covering with diatomaceous earth. This is illustrated by the following compositions which have given good castings free from cracks, splitting or porosity.

| Melt | $SiO_2$ | $Al_2O_3$ | $Fe_2O_3$ | $TiO_2$ | CaO | MgO | ZrO |
|------|------|------|------|------|-----|------|------|
| A | 36.4 | 0.6 | 0.33 | 0.14 | 3.4 | 44.0 | 15.2 |
| B | 30.1 | 0.9 | 0.27 | 0.41 | 2.5 | 35.9 | 29.9 |
| C | 17.1 | 1.8 | 0.55 | 0.83 | 0.8 | 19.2 | 59.8 |
| D | 11.0 | 2.1 | 2.32 | 0.78 | 0.5 | 14.2 | 69.1 |

The alumina in these melts (derived from the zirkite) may be considered an impurity, but since spinel is one of the major phases considered later, all alumina is calculated as spinel and the remaining magnesia as forsterite to give the following phase make up for equilibrium conditions.

| Melt | Forsterite | Magnesia spinel | Zirconia | Residue |
|------|------------|-----------------|----------|---------|
| A | 76.2 | 0.8 | 15.2 | 7.8 |
| B | 61.8 | 1.3 | 29.9 | 7.0 |
| C | 32.2 | 2.5 | 59.8 | 6.5 |
| D | 23.3 | 2.9 | 69.1 | 4.7 |

In practice some of the magnesia may be in solid solution with the zirconia but because of this is probably no more basic effectively than the forsterite at which it is calculated above.

If magnesia is added to the good forsterite-zirconia system the quality is impaired, compositions high in magnesia being porous and cracked or broken while compositions low in magnesia and high in forsterite show the characteristic splitting of simple forsterite compositions.

If, on the other hand, magnesia spinel is added as a third phase to the good forsterite-zirconia system, all ternary compositions with over 15% $ZrO_2$ and over 11% silica are excellent. Since magnesia spinel can thus be substituted in part for zirconia, a gradation in basicity is obtainable. Since silica is required anyway for the formation of forsterite, the alumina can be added as commercial bauxite, kyanite or other siliceous ore at a corresponding saving in cost over straight spinel compositions requiring the more expensive silica-free materials. Melts which have given good results are illustrated below.

| Melt | $SiO_2$ | $Al_2O_3$ | $Fe_2O_3$ | $TiO_2$ | CaO | MgO | ZrO |
|------|------|------|------|------|-----|------|------|
| E | 11.0 | 11.1 | 1.29 | 0.56 | 0.5 | 16.3 | 59.2 |
| F | 11.0 | 21.3 | 0.41 | 0.61 | 0.6 | 21.6 | 44.5 |
| G | 11.0 | 40.0 | 0.01 | 0.09 | 0.7 | 28.2 | 20.0 |
| H | 17.9 | 31.1 | 0.51 | 0.17 | 1.8 | 33.4 | 15.1 |
| I | 18.2 | 18.0 | 0.01 | 0.15 | 0.6 | 29.9 | 33.2 |
| J | 23.8 | 21.5 | 0.33 | 0.14 | 2.3 | 36.7 | 15.2 |
| K | 24.6 | 7.5 | 0.01 | 0.15 | 1.1 | 33.6 | 33.0 |
| L | 30.1 | 11.0 | 0.33 | 0.14 | 2.9 | 40.3 | 15.2 |

| Melt | Forsterite | Magnesia spinel | Zirconia | Residue |
|------|------------|-----------------|----------|---------|
| E | 20.7 | 15.5 | 59.2 | 4.6 |
| F | 22.8 | 29.8 | 44.5 | 2.9 |
| G | 21.4 | 55.9 | 20.0 | 2.9 |
| H | 36.7 | 43.3 | 15.1 | 4.9 |
| I | 39.6 | 25.2 | 33.2 | 2.0 |
| J | 49.1 | 30.0 | 15.2 | 5.7 |
| K | 53.2 | 10.5 | 33.0 | 3.3 |
| L | 62.5 | 15.4 | 15.2 | 6.9 |

While the addition of magnesia to the zirconia-forsterite system is undesirable, good castings can be made when additional magnesia is used in the presence of both forsterite and spinel with the zirconia. With a minimum of 11% silica, as much as 23% excess MgO has given good results with equal amounts (25%) of spinel and zirconia calculated melt O, but a further increase to 38% excess MgO gave cracked castings. With magnesia spinel calculated as low as 15%, I have obtained good castings with 25% magnesia in excess of that required for the formation of 42% forsterite; 15% $ZrO_2$ again being sufficient to eliminate the cracks otherwise obtained in this basic refractory. Since both 15% magnesia spinel and 15% zirconia appear to be minima in the presence of excess magnesia, a further increase of forsterite decreases the basicity. I have found the following compositions to give good castings.

| Melt | $SiO_2$ | $Al_2O_3$ | $Fe_2O_3$ | $TiO_2$ | CaO | MgO | ZrO |
|------|------|------|------|------|-----|------|------|
| M | 11.0 | 30.9 | 0.18 | 0.28 | 1.2 | 36.4 | 20.0 |
| N | 11.0 | 10.7 | 0.41 | 0.62 | 0.8 | 31.6 | 44.9 |
| O | 11.0 | 17.9 | 0.09 | 0.13 | 0.9 | 44.9 | 25.0 |
| P | 18.1 | 10.7 | 1.55 | 0.45 | 1.8 | 37.4 | 30.0 |
| Q | 17.9 | 21.9 | 0.78 | 0.23 | 2.0 | 42.2 | 15.0 |
| R | 18.1 | 14.4 | 0.68 | 0.22 | 1.9 | 44.6 | 20.1 |
| S | 17.9 | 10.8 | 0.78 | 0.23 | 2.3 | 53.0 | 15.0 |
| T | 24.0 | 11.0 | 1.35 | 0.23 | 3.3 | 45.1 | 15.0 |

| Melt | Forsterite | MgO | $ZrO_2$ | Magnesia spinel | Residue |
|------|------------|-----|---------|-----------------|---------|
| M | 25.9 | 9.3 | 20.0 | 43.2 | 1.6 |
| N | 25.9 | 12.5 | 44.9 | 14.9 | 1.8 |
| O | 25.9 | 22.9 | 25.0 | 25.0 | 1.2 |
| P | 42.6 | 8.7 | 30.0 | 15.0 | 3.7 |
| Q | 42.1 | 9.3 | 15.0 | 30.6 | 3.0 |
| R | 42.6 | 14.4 | 20.1 | 20.1 | 2.8 |
| S | 42.1 | 24.5 | 15.0 | 15.1 | 3.3 |
| T | 56.5 | 8.2 | 15.0 | 15.4 | 4.9 |

As previously noted, some of the magnesia is taken into solid solution in the $ZrO_2$ but in the table is all reported as MgO.

As is well known the mol values of any of the above batches may be ascertained by dividing each percentage by the molecular weight of the respective oxides. Thus the following table gives the millimols in 100 grams of the several batches:

| Melt | Millimols in 100 grams batch | | | |
|------|------|------|------|------|
|  | $SiO_2$ | $Al_2O_3$ | MgO | $ZrO_2$ |
| A | 607 | 6 | 1,091 | 123 |
| B | 502 | 9 | 890 | 243 |
| C | 285 | 18 | 476 | 485 |
| D | 183 | 21 | 352 | 561 |
| E | 183 | 109 | 404 | 480 |
| F | 183 | 209 | 536 | 361 |
| G | 183 | 392 | 699 | 162 |
| H | 298 | 305 | 828 | 123 |
| I | 303 | 177 | 742 | 269 |
| J | 397 | 211 | 910 | 123 |
| K | 410 | 74 | 833 | 268 |
| L | 502 | 108 | 999 | 123 |
| M | 183 | 303 | 903 | 162 |
| N | 183 | 105 | 784 | 364 |
| O | 183 | 176 | 1,114 | 203 |
| P | 302 | 105 | 928 | 243 |
| Q | 298 | 215 | 1,047 | 122 |
| R | 302 | 141 | 1,106 | 163 |
| S | 298 | 106 | 1,314 | 122 |
| T | 400 | 108 | 1,118 | 122 |

According to my invention therefore, I produce a cast refractory free from cracks, objectionable porosity or excessive brittleness and of a basicity depending upon the intended use, from $MgO$-$SiO_2$-$Al_2O_3$-$ZrO_2$ compositions as illustrated above and within the limits of the following claims.

What I claim is:

1. A heat cast refractory consisting essentially of zirconia, magnesia, alumina and silica and in which the zirconia is not less than 15% and the silica is not less than 11% and the mols of magnesia are substantially equal to the mols of alumina plus twice the mols of silica.

2. A heat cast refractory consisting essentially of zirconia, magnesia, alumina and silica and in which the zirconia is not less than 15%, the alumina is not less than 11%, the silica is not less than 11% and the mols of magnesia are greater than the mols of alumina plus twice the mols of silica.

3. A heat cast refractory containing a substantial amount of crystalline zirconia and over 21% forsterite in a non-crystalline matrix and in which the zirconia is not less than 15% and the silica not less than 11% by weight by chemical analysis.

4. A heat cast refractory having as two of its major crystalline constituents zirconia and forsterite in a non-crystalline matrix, the forsterite amounting to 21%.

5. A heat cast refractory containing substantial amounts of crystalline zirconia and forsterite in a non-crystalline matrix and in which the zirconia is not less than 15%, the silica is not less than 11% and the magnesia is not less than 15% by weight by chemical analysis.

6. A heat cast refractory having as two of its three major crystalline constituents zirconia and forsterite in a non-crystalline matrix and in which the zirconia is not less than 15%, the silica is not less than 11% and the MgO is not less than 15% by weight by chemical analysis.

7. A heat cast refractory having as its major crystalline constituents forsterite, magnesia, spinel and a solid solution of periclase, and zirconia, and containing by chemical analysis silica between 11 and 24%, alumina between 10 to 40%, zirconia between 15 to 59%, and magnesia between 10 to 53%.

THEODORE E. FIELD.